Sept. 7, 1926.

G. W. CARLSON

AUTOMOTIVE VEHICLE BRAKE

Filed Oct. 16, 1923

INVENTOR
Gustav W. Carlson
BY
Ward Crosby & Smith
his ATTORNEYS

Patented Sept. 7, 1926.

1,599,076

UNITED STATES PATENT OFFICE.

GUSTAV W. CARLSON, OF CLEVELAND, OHIO, ASSIGNOR TO THE EATON AXLE & SPRING COMPANY, OF CLEVELAND, OHIO, A CORPORATION OF OHIO.

AUTOMOTIVE VEHICLE BRAKE.

Application filed October 16, 1923. Serial No. 668,805.

The invention relates to automotive vehicle brakes and more particularly to brake-actuating apparatus for front or other axles having the wheels swiveled thereto, so as to be swung about an upright axis, i. e., a knuckle joint, to steer or turn the machine.

Various means have been provided for actuating brakes applied to such wheels, but in practice great difficulty has been experienced in the use of such means provided for mechanically applying the brakes to the swiveled wheels. Such brakes must be operated reliably and efficiently without interfering with the free swinging of the wheels about the knuckle joint for steering purposes, and the wheels must be capable of being freely swung to any of their operative positions without affecting the degree to which the brakes may have been applied to the wheels, and without affecting the extent to which the brake lever must be operated to apply any given degree of braking.

The object of this invention is to provide brake actuating apparatus which will attain these desired results.

The invention consists in the novel features, arrangements and combination of parts embodied in the apparatus hereinafter described as illustrating the preferred form of the invention, and the invention will be more particularly pointed out in the appended claims.

Further objects and advantages of the invention will more fully appear from the following description taken in connection with the accompanying drawings which show, by way of example, the present preferred embodiment of the invention.

Referring to the drawings—

Fig. 4 is a top plan view of a detail of the brake-actuating apparatus taken on line 4—4 of Fig. 1 and looking in the direction of the arrow.

Figure 1:
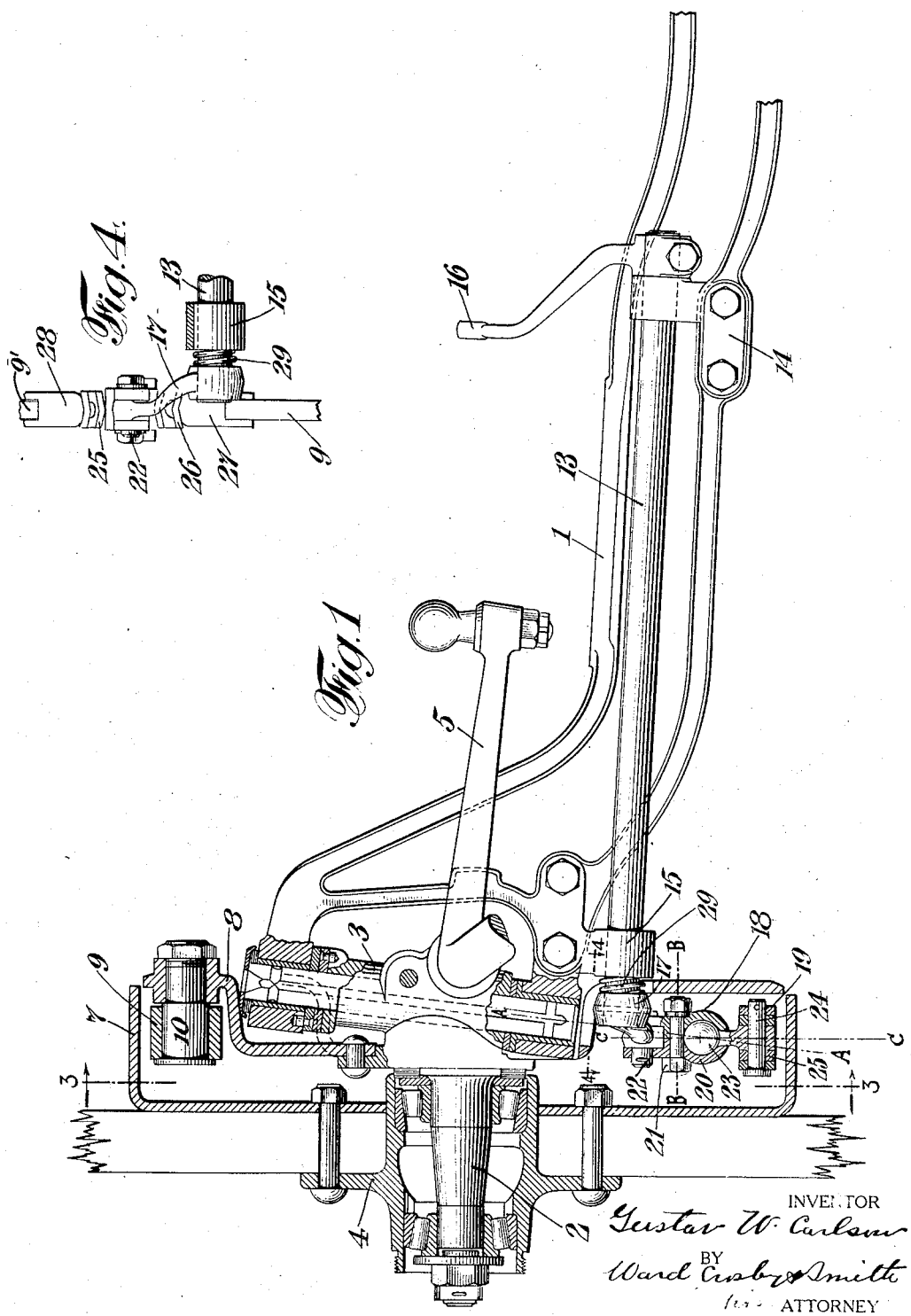
Fig. 1 illustrates a rear elevation of a part of a front axle and one wheel, with the wheel and part of the brake apparatus in section along line 1—1 of Fig. 3, and with certain parts broken away.
Figure 2:
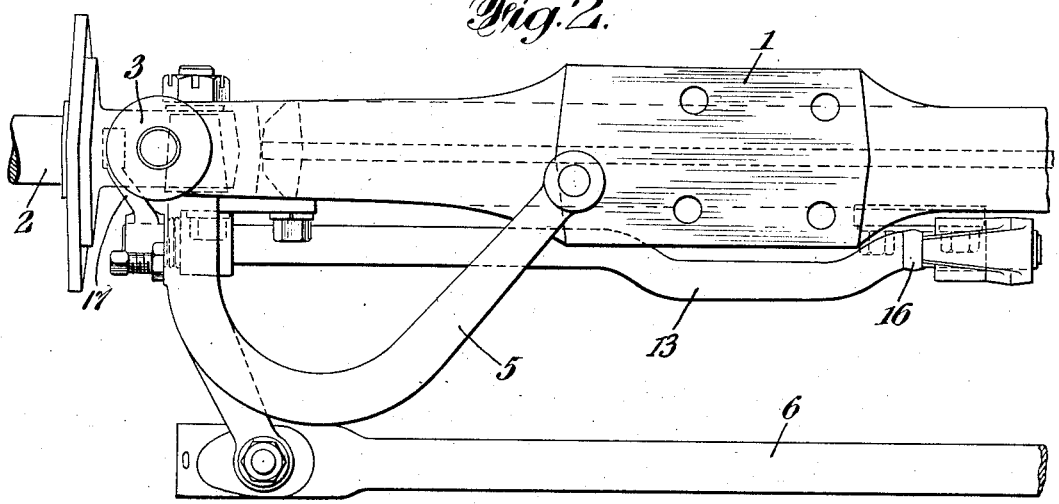
Fig. 2 is a top plan view of a part of the axle with the wheel and brakes removed.

Referring to Fig. 1, 1 is the axle upon which a wheel spindle 2 is swiveled about an upright axis by means of any suitable known form of knuckle 3. The wheel 4 is mounted on this spindle and the spindle is swung about this axis, as is well understood, by the steering lever 5 suitably connected through rod 6, with the spindle of the other wheel, all of which is well understood and forms no part of the present invention and therefore need not be further described. The wheel 4 carries in any suitable well known manner, a brake drum 7 closed on one side, as is customary, by the co-operating spider or plate 8 upon which the brake element 9, 9' are hinged at their upper ends upon pins 10, 10' (see Fig. 3). The brake elements are normally held away from the brake drum as shown, by means of suitable springs 11, 11' and 12, when the braking lever is released.

Figure 3:
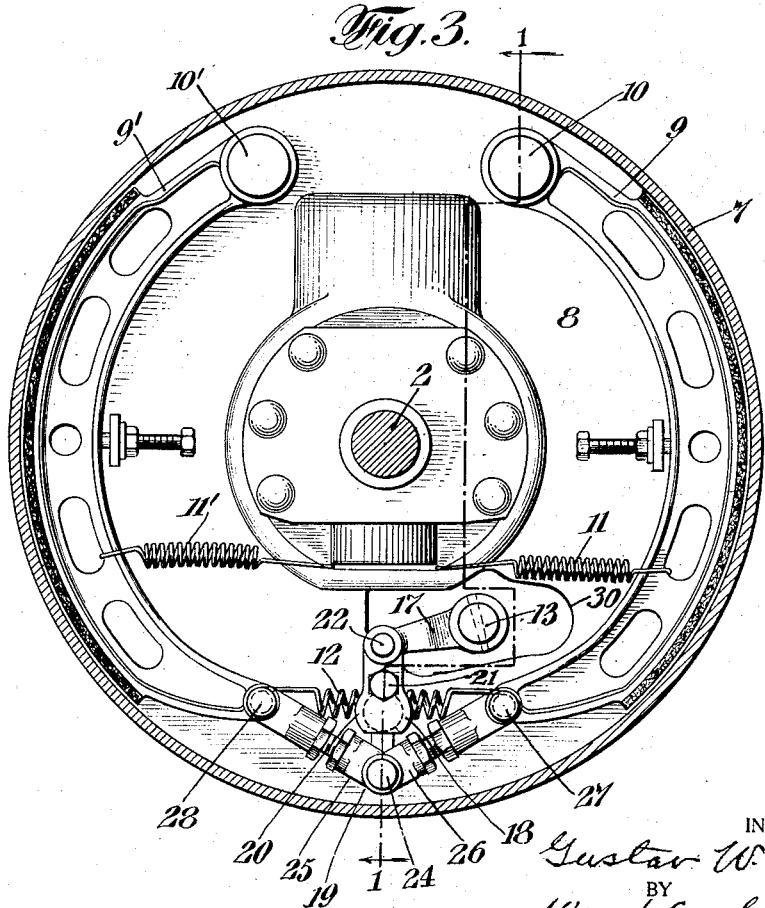
Fig. 3 is a sectional view through the brake drum taken on line 3—3 of Fig. 1 and looking in the direction of the arrow.

It will be noted from Figs. 1 and 3 that the wheel spindle 2 carrying the wheel, drum 7 and the spider 8 on which the brake elements are mounted, is swung with respect to the load axle for steering the machine, and this movement must not be interfered with by any apparatus provided for actuating the brakes, nor must such apparatus in any way tend to tilt the brake elements 9, 9' out of parallelism with the brake drum when the brakes are applied so as to cause application of the brakes only along a part of the surface of the brake elements. Also if the swinging movement of the spindle 2 about the knuckle axis should bring about or exert thrusts or tension between the brake elements and the brake-actuating mechanism, this would have the effect of altering the braking force already applied to the wheel before the wheel was turned from one position to another, and would also vary the extent of the braking force if applied to the wheel in one position from that which would be applied to it in another position by the same given movement of the brake-actuating apparatus; all of which as heretofore generally pointed out, is dangerous and highly undesirable. These objections are made more difficult to overcome in axles having knuckles inclined transversely as here shown, but it is rather generally held that the inclined knuckle is important if not necessary in order to withstand the strains brought upon the steering gear and linkage due to the application of brakes to the swiveled wheels. The following construction and arrangement of the brake-actuating apparatus is such as to obviate the above difficulties.

The brake shaft 13 is mounted at the rear of the axle 1 by any suitable means such as by brackets 14, 15 one at each end of the shaft which hold the shaft rigidly from any lateral movement away from the axle but permit the shaft to be rocked about its axis when the actuating lever 16 is operated by the driver. On the outer end of the shaft is rigidly mounted a lever 17 which, as shown by the different views, extends forwardly from the shaft toward the upright axis of the knuckle and laterally outwardly toward the wheel and terminates approximately in alignment with said axis at a point below the knuckle so that it can be swung upward. The free end of this lever is connected by a ball and socket joint 18 with a toggle connection 19 for actuating the brake elements, as will now be described.

The ball and socket joint, as shown in the present embodiment, consists of an upper socket member 20 split longitudinally and having the parts bolted together by a bolt 21, and the socket members are extended upwardly and swiveled to the free end of lever 17 by means of a pin 22, while the ball member 23 is swivelly connected by means of a pin 24, to the toggle members 25, 26 which are in turn swiveled to the brake elements at 27, 28. The upper extension of the socket 20 constitutes a link between the lever 17 and the ball and socket joint. The ball and socket connection is so arranged and positioned that the center of the ball normally lies in alignment with the axis of the knuckle joint (see line A) so that as the wheel spindle is swung about this axis the ball will freely turn in the socket without setting up any stresses which would tend to produce any linear movement of the toggles or any movement of lever 17, and without producing lateral thrusts on the toggle members, i. e., thrusts to the left or right as viewed in Fig. 1 which would tend to tilt the braking elements out of parallelism with the drum. When the brakes are to be applied the actuating lever 16 is pulled rearwardly rocking shaft 13 and swinging lever 17 upwardly to lift the toggles and apply the brakes against the action of the springs 11, 11' and 12. This upward movement, of course, elevates the center of the ball, and since the axis of the knuckle joint about which the wheel spindle swings is somewhat tilted from the perpendicular, and since the ball moves upwardly along a vertical line, the upward movement of the ball will throw its center very slightly out of the line of the axis of the knuckle, but the movement is so slight as to be immaterial for all practical purposes as regards the free swinging of the wheel spindle without interference from the braking apparatus, and without the swinging movements interfering with the proper application of the brakes. In Fig. 1 horizontal line B—B indicates approximately the upper limit of the ball movement in applying the brakes, and vertical line C indicates the line of movement of the center of the ball so that the distance between the intersection of line A with line B and the intersection of line C with line B shows the slight extent to which the center of the ball is ever displaced from the axis of the knuckle. It remains substantially on the line.

The ball and socket joint thus provides a flexible connection between the brake elements and toggle on one end and the shaft and lever on the other, so that the brake elements remain at all times in their correct planes with respect to the brake drum, and the brake shaft and connected levers are free from interference and are unaffected by the swinging of the knuckle. In the described embodiment of my invention there is no fore and aft movement of the brake lever 16 with the turning of the wheels, and the brake lever is absolutely unaffected by anything but the operation of the brake rod. The arrangement of the ball and socket is also such as to provide a positive connection between lever 17 and the toggles both for lifting and lowering the toggles, so that the movement of the brake lever for the purpose of releasing the brakes causes the brake elements to be positively moved away from the brake drum. The movement of the toggles by the brake lever is thus positive in both directions. Furthermore, the entire connections between the brake shaft and the free ends of the brakes lie wholly outside of the knuckle proper, thus considerably reducing the cost of construction and permitting ready access for inspection and repairs.

In order to make clearance between the flange or spider 8 and the brake shaft 13, the flange is cut away as at 30. The shaft is held rigidly upon the load axle from movement toward or from the same, allowing only the necessary rocking movement and some longitudinal movement, if desired, the latter being taken up and controlled by the spring 29 positioned about the shaft between the lever 17 and the bracket 15.

While I have described my invention in detail in connection with that embodiment thereof which I have selected as the preferred one, it will be understood by those skilled in the art, after understanding my invention, that changes and modifications may be made without departing from the spirit or scope of the invention, and I aim in the appended claims to cover all such changes and modifications as come within the spirit and scope of the invention.

What I claim as new and desire to secure by Letters Patent, is:—

1. In apparatus of the character described, the combination of a load axle, a wheel spindle swiveled by an upright knuckle at the end of the axle and carrying a wheel and brake drum, brake elements hinged at their upper ends upon a part carried by the wheel spindle, a rockable brake shaft, means securing the shaft to the axle, means for rocking the shaft to apply the brakes, a toggle connection between the brake elements at their free ends located below the lower end of the upright knuckle, and means connecting the brake shaft with the toggle, said means lying wholly outside of the knuckle and below the lower end of the same and comprising a ball and socket joint, the center of the ball lying substantially in the line of the axis of the knuckle.

2. In apparatus of the character described, the combination of a load axle, a wheel spindle swiveled by an upright knuckle at the end of the axle and carrying a wheel and brake drum, brake elements hinged at their upper ends upon a part carried by the wheel spindle, a rockable brake shaft at the rear of the axle, means securing the shaft to the axle, means for rocking the shaft to apply the brakes, a toggle connection between the brake elements at their free ends, and means positively connecting the brake shaft with the toggle comprising a lever below the knuckle and a ball and socket joint, the center of the ball lying substantially in the line of the axis of the knuckle.

3. In apparatus of the character described, the combination of a load axle, a wheel spindle swiveled by an upright knuckle at the end of the axle and carrying a wheel and brake drum, brake elements hinged at their upper ends upon a part carried by the wheel spindle, a rockable brake shaft at the rear of the axle, means securing the shaft to the axle, means for rocking the shaft to apply the brakes, a toggle connection between the brake elements at their free ends, and means positively connecting the brake shaft with the toggle comprising a lever, a link and a ball and socket joint each located below the lower end of the knuckle, the center of the ball lying substantially in the line of the axis of the knuckle.

4. In apparatus of the character described, the combination of a load axle, a wheel spindle swiveled by an upright knuckle at the end of the axle and carrying a wheel, a brake drum and co-operating brake elements, of a rockable shaft at the rear of the axle, means for securing the shaft to the axle, means for rocking the shaft to apply the brakes, a lever at the end of the shaft extending forwardly below the knuckle toward the axis of the knuckle, a toggle connection at the free end of the brake elements for actuating the brakes, and a ball and socket connection between the toggle and said lever, the center of the ball lying substantially in the line of the axis of the knuckle, and the lever being sufficiently below the knuckle to enable the lever to be swung upward to apply the brakes, whereby the wheel spindle may be swung about its knuckle without being interfered with by the brake apparatus, and the application of the brakes will not be interfered with by the swinging of the wheel spindle.

5. In apparatus of the character described, the combination of a load axle, a wheel spindle swiveled by an upright knuckle at the end of the axle and carrying a wheel and a brake drum, brake elements hinged at their upper ends on a vertical flange carried by the spindle and co-operating with the drum to form an enclosure for the brake elements, a rockable brake shaft at the rear of the axle and having its outer end lower than the bottom of the knuckle, means securing the shaft to the axle, means for rocking the shaft to apply the brakes, a lever at the outer end of the shaft extending forwardly below the knuckle toward the line of the axis of the knuckle, a toggle connection at the free end of the brake elements for actuating the brakes, and a ball and socket connection between the toggle and said lever, the center of the ball lying in the upright plane of the brake elements and substantially in the line of the axis of the knuckle, and the point of connection of the ball and socket with the lever also being in close proximity to said line, and being sufficiently below the knuckle to enable the lever to swing upward to apply the brakes, the movement of the ball and socket by the lever being such that at no position of the ball and socket is the center of the ball moved sufficiently out of the line of the axis of the knuckle to produce stresses or strains which would cause the swinging of the wheel spindle to appreciably affect the application of the brakes or cause the braking apparatus to interfere with the swinging of the wheel.

In testimony whereof I have signed my name to this specification.

GUSTAV W. CARLSON.